UNITED STATES PATENT OFFICE.

CHARLES H. O'ROURKE, OF NEW ORLEANS, LOUISIANA.

ANIMAL, FOWL, AND POULTRY FEED AND PROCESS FOR MAKING SAME.

1,286,742.     Specification of Letters Patent.     Patented Dec. 3, 1918.

No Drawing.     Application filed December 15, 1917. Serial No. 207,340.

*To all whom it may concern:*

Be it known that I, CHARLES H. O'ROURKE, a citizen of the United States, residing at New Orleans, in the parish of Orleans and State of Louisiana, have invented certain new and useful Improvements in Animal, Fowl, and Poultry Feeds and Processes for Making Same, of which the following is a specification.

Nature has created in the Southern States of the United States of North America two of the world's most valuable feed nutrients which after years of effort have been found to possess, when properly combined, the nutritive elements of American Indian corn. Through the combination of materials as specified herein a product can be produced embodying approximately the nutritive feeding value of American Indian corn, of a bulk (*i. e.* size in relation to a unit of weight) more economically adaptable to the efficient feeding of lower forms of animal life.

The object of this invention is to produce an animal food of superior quality and economical character and which is susceptible to variations of its bulk in which, in all cases, there will be achieved a coördination of the bulk of the material and its percentage of carbo-hydrates with reference to the needs of the particular animal to be fed, *i e.* the bulk of the material is adapted to the anatomical requirements of the animal while at the same time the material will contain the proper percentage of carbo-hydrates required for the feeding of such animal.

In practising this invention, bagasse, molasses (usually derived from saccharine plants), and cotton seed meal (either cooked or cold pressed) are combined (in accordance with the nutritive contents of each material) as to produce:

1st: A ration for animals whose bulk is in suitable proportion to the anatomical requirements of the animal to be fed.

2nd: A material comprising the co-efficients in food nutrition proportioned as to fats, protein, carbohydrates, fiber and moisture required for the specific feeding of certain animals.

3rd: A material which is susceptible to varied mechanical treatment either to insure its fluffiness in the form of a meal for feeding bovine stock or its concentration into small, hard particles like grain for the feeding of horses, mules, poultry, fowls, &c.

Sugar cane bagasse (reduced to practically a dried state), contains approximately: water 7.72%, nitrogen 0.36%, ammonia 0.44%, protein 2.25%, carbohydrates 42.58%, crude fiber 43.50%, and ash 2.65%.

Cotton seed meal (cooked, old process, hydraulic pressure mills) contains approximately: water 8.52%, protein 43.26%, fats 13.45%, carbohydrates 22.31%, crude fiber 5.44%.

Cotton seed meal (cold process extraction: expellers, non-heating: including meats and hulls), contains approximately: water 9.75%, protein 28.20%, fats 6.16%, carbohydrates 30.00%, crude fiber 20.00%.

Sugar cane molasses ("Black strap") contains approximately: water 22.37%, dry matter 77.63%, protein 2.36%, carbohydrates 65.99%, and ash 9.28%.

Sugar beet molasses contains approximately: water 20.80%, dry matter 79.20%, protein 9.10%, carbohydrates 59.50%, and ash 10.60%.

A specific formula combining the three main ingredients specified cannot be laid down as standard for the reasons: (1) The chemical properties of any vegetable product vary according to the elements of soil, climate and season and the variation of such properties is extended when vegetable products are subjected to mechanical processes in the hands of human agents; (2) the by-products of the oil mill and the sugar mill are variable according to the efficiency of each individual mill; (3) different classes of animals require different proportional amounts of the ingredients, *i. e.* the proportions of the mixture to be used in feeding sheep will be different from the proportions of the mixture to be used in feeding dairy cattle for butter fat production. In general, it may be pointed out, that in the practice of the invention a predetermined portion, by bulk measurement, of dried bagasse has incorporated with it molasses and cotton seed meal to make up the complete mixture and to produce a balanced ration proportioned in such manner as will be best adapted for the particular class of animals for which the feed may be intended. For example, and without restricting myself to the precise proportions recited, horses and mules will be fed with a proportion of approximately 25% cotton seed meal and 75% of the mixture of bagasse and molasses; milk producing cattle will be fed with a proportion of approximately 35% cotton seed meal and 65% of the mixture of bagasse and molasses; and hogs will be fed with a proportion of approximately 40% cotton seed meal and 60% of the mixture of bagasse and molasses. The mixture of bagasse and molasses will be varied for the different classes of animals, (as will be hereinafter explained in detail) in order that it may be appropriate for the particular class of animals for which the feed may be intended.

In practising the invention sugar cane bagasse is baled at the sugar mill to expunge the air, thereby arresting fermentation, and afterward treated to insure a reduction of its moisture and fiber contents through artificial drying and proper mechanical manipulation. The reduction of the moisture and fiber contents of the dried bagasse has the effect of increasing the bulk of the pith and also the percentage of the carbo-hydrate content. Obviously the bulk and percentage of carbo-hydrate content will be increased more or less accordingly as there may be a greater or less reduction or separation of the moisture and fiber contents and by reason of this fact the purpose of this preliminary treatment, viz. to increase the bulk and percentage of carbo-hydrate content of the bagasse to desired degrees, may be fully realized. Molasses (usually derived from saccharine plants), (salt and capsicum, if used) is then infused into the residue of bagasse and preferably these materials are heated to a temperature insuring their thorough amalgamation.

In all cases there is achieved a coördination of the bulk of the material and its percentage of carbo-hydrates with reference to the needs of the particular animal to be fed, i. e. the bulk of the material is adapted to the anatomical requirements of the animal while at the same time the material will contain the proper percentage of carbo-hydrates required for the feeding of such animal.

While, as stated, no standard formula can be laid down, the coördination of the bulk of the material and its percentage of carbo-hydrates with reference to the needs of the particular animal to which the material is to be fed, will be apparent from the following examples relating to food for sheep and to food for dairy cattle wherein, as above stated, the proportions of the mixture must be varied.

Thus, for feeding sheep I add to bagasse having a known percentage of carbo-hydrates, a percentage of molasses which bears a definite relation to the percentage of carbo-hydrates in the bagasse and which will secure the desired coördination of the bulk of the material and its total percentage of carbo-hydrates. As a specific instance with reference to food for the feeding of sheep it may be assumed that the bagasse contains 50 per cent. of carbo-hydrates. To such bagasse I add 50 per cent. of molasses, i. e. to 50 pounds of the bagasse I add 50 pounds of molasses; and the bagasse by such treatment with molasses will have a carbo-hydrate content of approximately 55 per cent. This food while very well adapted for the feeding of sheep, both as to its carbo-hydrate content and to its bulk, would not be suitable, particularly in respect to its bulk, for the feeding of dairy cattle for butter fat production. Thus if we assume, as stated, the bagasse to contain 50 per cent. of carbo-hydrates, the quantity of molasses to be added, whereby to secure food suitable for the feeding of dairy cattle for butter fat production, will be 20 per cent. In other words, where, as in the example first given, the bagasse contains 50 per cent. of carbo-hydrates, to 80 pounds of such bagasse I add 20 pounds of molasses, the bagasse by such treatment with molasses having a carbo-hydrate content of approximately 53 per cent. and having at the same time a bulk adapted to the anatomical requirements of dairy cattle but not adapted to the anatomical requirements of sheep.

Dry bagasse shrinks upon contact with moisture until the limit of saturation is reached and, below such limit, the greater the amount of moisture the greater will be the degree of shrinkage. The molasses which is added will in all cases be below the saturation limit of the bagasse. It will be manifest, therefore, that the volume or bulk of the bagasse after the treatment with molasses for the feeding of dairy cattle will be substantially greater, e. g. 50 per cent. more or less, than the volume of a like weight of bagasse after treatment with molasses for the feeding of sheep. It will also be manifest that the carbo-hydrate content of the bagasse becomes proportionately greater as the bulk is reduced (relatively) by the addition of molasses. Hence, the treatment with molasses in all cases is such as to coördinate the bulk and the carbo-hydrate content thereof with reference to the peculiar needs of the particular animal or class of animals for which the feed may be intended. In other words the proper percentage of the carbo-hydrates for the feeding of the particular animal or class of animals for which the feed is intended is certainly and reliably regulated or controlled by the addition of molasses in a quantity dependent on and determined in view of two inter-related factors, viz., the requirements of the animal to be fed and the percentage of carbo-hydrates originally contained in the bagasse. The quantity of molasses to be added must, therefore, be left to the discretion of the individual as determined by his knowledge and experience on the subject of animal feeding.

In the practice of using salt or capsicum and in cases where either or both these materials are used they are either mixed in solution with molasses before infusion into bagasse or added in a dry, granulated state after the main ingredients have been mixed or at the time of such mixture.

Cotton seed meal (either produced by the cooking hydraulic process or cold pressed and afterward ground into a meal) is then introduced into the mixture and the product (preferably heated when to be compressed) either compressed into small, hard particles for the feeding of poultry, fowls, horses, mules, hogs, &c., or left in a meal form for the feeding of cattle such as cows, oxen, sheep, goats, &c.

Having described the nature and object of the invention what I claim as new and desire to secure by Letters Patent is:—

1. An animal feed which includes a mixture of bagasse and molasses, the bagasse having been preliminarily treated to reduce its moisture and fiber content to a determined bulk, and the molasses being present in a quantity necessary to secure the proper coördination of the bulk and carbo-hydrate content of the mixture with reference to the need of the particular class of animals for which the feed is intended.

2. The process of regulating the bulk of animal feeds for different classes of animals with respect to the carbo-hydrate bearing constituent which consists in preliminarily making a determined reduction of the moisture and fiber contents of sugar cane bagasse, thereby to increase as desired its bulk and in mixing with such preliminarily treated bagasse a particular quantity of molasses selected to determine the proper coordination of the bulk and the carbo-hydrate content of the mixture with reference to the needs of the particular class of animals for which the feed may be intended.

In testimony whereof I have hereunto set my hand in the presence of two subscribing witnesses.

CHARLES H. O'ROURKE.

Witnesses:
H. G. HESTER,
EDW. RIGHTOR.